United States Patent [19]

Drexler

[11] 4,385,372
[45] May 24, 1983

[54] REFLECTIVE OPTICAL DATA STORAGE AND LASER RECORDING MEDIA HAVING GROOVED DIELECTRIC ENCODED PRERECORDED INFORMATION

[75] Inventor: Jerome Drexler, Los Altos Hills, Calif.

[73] Assignee: Drexler Technology Corporation, Mountain View, Calif.

[21] Appl. No.: 259,444

[22] Filed: May 1, 1981

[51] Int. Cl.$^3$ ............................ G11B 7/00; G11B 7/24; G11B 7/26
[52] U.S. Cl. .................................. 369/109; 369/275; 369/286
[58] Field of Search ...................... 369/109, 275, 286

[56] References Cited

U.S. PATENT DOCUMENTS

| | | | |
|---|---|---|---|
| 3,931,459 | 1/1976 | Korpel | 178/6.6 A |
| 4,161,752 | 7/1979 | Basilico | 358/128 |
| 4,233,626 | 11/1980 | Bell | 358/128.5 |
| 4,238,179 | 12/1980 | Llabres et al. | 425/394 |
| 4,238,843 | 12/1980 | Carasso et al. | 369/54 |
| 4,275,091 | 1/1981 | Lippits et al. | 427/53.1 |
| 4,325,135 | 4/1982 | Dil et al. | 369/109 X |

FOREIGN PATENT DOCUMENTS

| | | | |
|---|---|---|---|
| 21411 | 1/1981 | European Pat. Off. | 369/109 |
| 2036410 | 6/1980 | United Kingdom | 369/275 |

OTHER PUBLICATIONS

"Ten Billion Bits on a Disk"; IEEE Spectrum, Aug. 1979; Bulthuis et al., pp. 26–33.

*Primary Examiner*—Aristotelis M. Psitos

[57] ABSTRACT

An optical data storage and recording material in which a reflective major surface layer is coated with an optically clear dielectric material having grooves therein. The dielectric material is itself transparent and data may be recorded by grooves created in the dielectric material. The grooves may have one depth primarily for destructive interference of light and another depth for interference and light scattering, thereby permitting two levels of encoding for prerecorded information, as well as user data formed by laser generated pits in the reflective major surface layer.

17 Claims, 4 Drawing Figures

REFLECTIVE OPTICAL DATA STORAGE AND LASER RECORDING MEDIA HAVING GROOVED DIELECTRIC ENCODED PRERECORDED INFORMATION

DESCRIPTION

1. Technical Field

The invention relates to reflective optical data storage and recording media and more particularly to such media for use with dielectric encoded prerecorded information. Frequently, in reading optically recorded data there is a need for prerecorded information, such as control information to accompany user data so that the user data may be properly identified and followed along proper data paths. The prerecorded information may be read during writing as well as after writing of the data. The prerecorded information may also represent user information on a read-only optical disc such as a video disc.

2. Background Art

In an article entitled "Ten Billion Bits on a Disk" by K. Bulthuis et al. in IEEE Spectrum, August, 1979 the authors discuss advantages of a pregrooved, phase encoded optical data storage disk. The disk may be divided into pie-shaped pieces, called sectors, with circular data paths traversing all sectors. Each sector has paths with a heading address and synchronization information. The disk consists of a major surface having grooves which are one quarter and one eighth wavelength deep relative to a reference elevation portion of the surface. The reference elevation portion, as well as the grooves are reflective and opaque. Information is encoded on the disk by the prerecorded grooves, as well as in laser created pits superimposed on the grooves, usually by a user. The user will write data in the form of bits in data paths within a sector, using the prerecorded grooves to guide a writing laser.

Data is read by differences in contrast which exist between different portions of the material for light reflected from it. Grooves having a depth of one quarter wavelength and one eighth wavelength reflect light at different amplitudes because of interference effects. A laser created hole which is superimposed on one of the eighth wavelength grooved areas reduces reflective output intensity in the hole to nearly zero. In summary, there are four levels of reflected light intensity: (1) the reflective reference level which produces the highest amount of reflected light (2) a one eighth wavelength groove producing a second lower level of reflected light, (3) a one quarter wavelength groove producing a third lowest level, (4) a hole producing a low level of reflected light similar to that of (3). A disk of this type is usually made by stamping the necessary grooves in a plastic material, then vapor depositing a reflective metal coating for laser recording, such as tellurium, over the exposed surfaces.

A different way of utilizing phase and interference effects in optical recording medium is shown in U.S. Pat. No. 4,233,626 to Bell, issued Nov. 11, 1980. This patent discloses disposing a highly reflective recording layer such as aluminium, on a substrate, coating the reflective layer with a highly transparent dielectric material and then coating the transparent dielectric material with a metallic layer of low to moderate reflectivity such as tellurium or titanium. Pits made in this layer with a laser appear highly reflective. The thickness of the dielectric material is such that the optical path for light which traverses pits in the top reflective layer causes phase cancellation of wave fronts in the reflected wave. In Bell's medium there is no prerecording of grooves. Bell teaches that his top reflecting metal layer may be replaced by a dielectric reflector.

An object of the present invention was to devise reflective optical data storage and laser recording media having pre-recorded encoded data of the reflective type, created by light interference and scattering from prerecorded grooves in a dielectric layer on top of the reflective laser recording medium, or read-only reflective surface which does not require formation of a reflective metallic surface subsequent to prerecorded groove formation. Another object is to utilize the dielectric encoded layer to encapsulate and protect the reflective laser recording medium or read-only reflective surface.

DISCLOSURE OF INVENTION

The above objects have been achieved with optical data storage and laser recording media which feature a major highly reflective surface disposed on a substrate which is coated by very thin optically clear dielectric material, such as an ultraviolet or heat curable plastic material or a heat softened plastic material, into which depressions are pressed or molded. Some of the depressions have a depth equal to approximately one quarter wavelength in air with the laser light used for reading the data, while other depressions have a depth equal to about one eighth of a wavelength in air with the laser light. The approximate quarter wavelength deep grooves should be adjusted in length experimentally to yield the lowest reflectivity from the recording layer as seen through the groove. The depth of the one eighth wavelength grooves should be selected to be approximately one half the depth of the quarter wavelength grooves. It would be possible to use three-quarter and three-eighth wavelength grooves but they would not be preferred. The dielectric material has an index of refraction sufficiently high such that light is scattered in various directions from the depressions or creates interference thereby lowering the amount of specularly reflected light from portions of the disk where grooves exist, compared to a greater percentage of reflected light coming from the underlying major reflective recording surface. It is preferred to have the dielectric layer thin enough such that the depressions and the reflective recording layer are both within the depth of focus of the reading laser beam although this is not essential. The thickness of the dielectric layer should be the equivalent of an integral number of half wavelengths at the characteristic wavelength of the read/write laser so that the reflectivity of the recording layer as seen through the dielectric layer is reduced a minimal amount. That is, maximum reflectivity is preferred. The prerecorded data in the depressions may be read either by the laser doing the writing or by a separate read laser. Specularly reflected light is that percentage of the light which is reflected normal to a reflective surface compared to the amount of incident light striking the reflective surface at an angle normal or perpendicular to the surface. A minimum refractive index of 1.4 is desirable to maximize the scattering effect but lower indices will work. The depressions preferably should be approximately one quarter wavelength and approximately one eighth wavelength. The width of the depressions typically would range between one half wavelength to one wavelength of the reading laser although somewhat narrower or wider depressions would work.

The depressions may be pressed into plastic or molded from a liquid dielectric material and then cured. These depressions are useful for defining servo tracks and address information needed for writing and reading information. The depressions are especially useful in sectored disks where prerecorded information is customarily provided preceding user data space. It can also be used for recording programming information.

BRIEF DESCRIPTION OF DRAWINGS

The details of my invention will be described in connection with the accompanying drawing, in which.

BEST MODE FOR CARRYING OUT THE INVENTION

Figure 1:
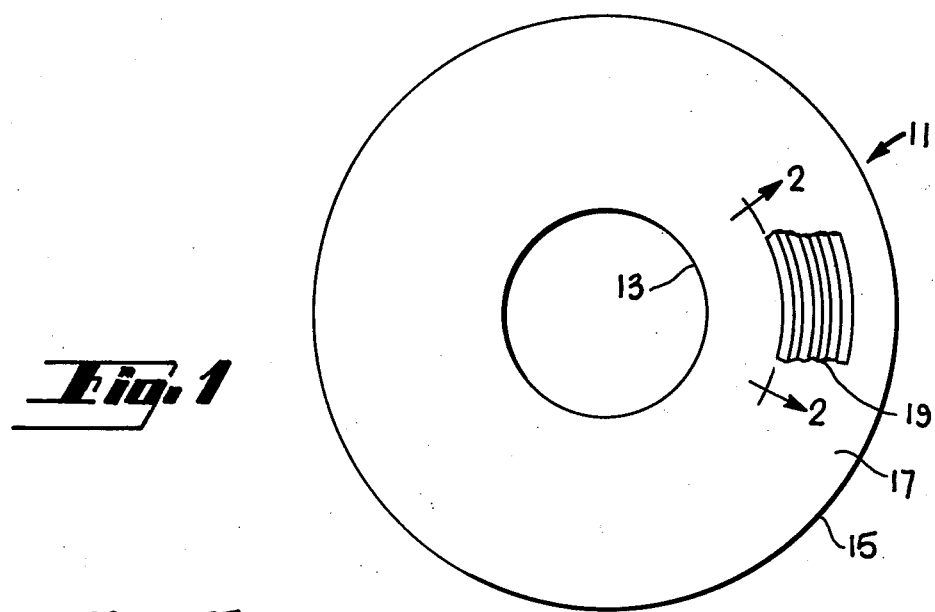
FIG. 1 is a top plan view of a grooved disk recording medium of the present invention.

With reference to FIG. 1, a disk shaped medium 11 is shown. The medium need not have the shape of a disk, but disk media are often preferred because playback systems have been previously developed with servo control mechanisms which facilitate random access to desired data. However, plates and rectangular strips may also be used. Such servo mechanisms are analogous to similar servos used in the field of magnetic recording. The disk is generally a flat annulus, resembling a record, with an inside limit defined by the circle 13 and an outer limit defined by the concentric circle 15. The inside of circle 13 is void of any material, so that the disk may be placed on a centering spindle for rotation. Between the concentric circles 13 and 15 which define the limits of the disk is a recording area 17. The recording area may be divided into a plurality of pie-shaped sectors, not shown.

On the disk are concentric or spiral data paths, traversing the sectors, each data path having a slightly different radius than in the adjacent track. The tracks may not be visibly identified by boundaries, but for purposes of illustration, such boundaries have been added to illustrate a magnified portion 19 consisting of seven adjacent tracks. These magnified tracks might have a center-to-center separation of one to ten microns. Within the circular or spiral tracks, data is written and read optically, preferably using small near-infrared semiconductor lasers although any visible laser could be used.

Figure 2:
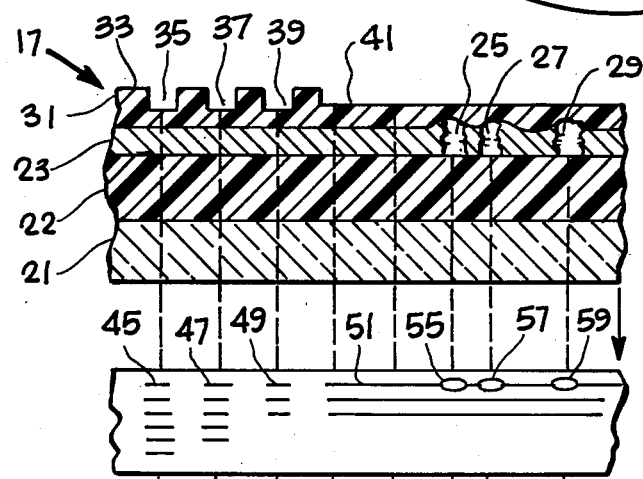
FIG. 2 is a magnified sectional view of a data path taken along lines 2—2 in FIG. 1.

With reference to FIG. 2, a depthwise sectional view of a lengthwise portion of a single track of the recording medium of the present invention may be seen. The medium includes a generally flat substrate 21, which is preferably made of glass, metal or stable plastic. In the case of a laser recording medium, the substrate may be an underlayer 22 which provides thermal insulation, acts as a subbing layer and may even absorb laser beam energy. Over this underlayer is a reflective layer 23 which may be any well-known reflective laser recording material, such as tellurium, rhodium, or the like, but which is preferably the reflective component of Drexon material, a trademark of Drexler Technology Corporation, Palo Alto, California, for a commercially available reflective recording material derived from silver-halide photographic emulsions, described in greater detail below. The thickness of the reflective layer 23 is generally less than 0.2 microns and typically 0.03 to 0.1 microns, but the underlayer 22 should have uniform thickness of about 1–10 microns and the upper surface of the material should be as flat as possible. Underlayer 22 may be one or more common photographic emulsion colloids, as used in commercial photographic films and plates. Where layer 23 is the reflective component of Drexon material, underlayer 22 is a colloidal layer coated on top of one or more very thin subbing layers. Although underlayer 22 is preferred to increase the recording sensitivity it is not essential.

In the case of a read-only optical disc, such as a video disc, underlayer 22 is not essential and layer 23 would be a highly reflective metal layer such as aluminum, which is used in video discs or, for example, chromium or silver. There would be no holes 25, 27, 29 since a low power laser beam would be used to read the data.

The reflective layer 23 is the major surface for laser recording by a laser having a predetermined characteristic wavelength and sufficient energy for pitting the reflective layer 23 or making holes therein. Thus, the laser used for writing on the record medium and the characteristics of the recording material must be selected so that they cooperate in forming pits or holes in the recording layer. Preferably, the pits or holes will completely penetrate the reflective layer so that the reflective layer will have voids therethrough such as the holes 25, 27 and 29.

On top of the reflective layer 23 is disposed a transparent dielectric layer 31 which typically may be a transparent polymer layer capable of being pressed, molded or formed from liquid state to create grooves. To form this grooved dielectric layer standard techniques used in replicating commercial video discs may be employed. For example, see U.S. Pat. No. 4,238,179 entitled Arrangement for Pressing Flexible Discs and a Pressing Process Using the Arrangement by Thomson-CSF. Also, clear polymethyl methacrylate or polyvinyl chloride have been used in conjunction with injection molding or compression molding or the two step injection/compression molding. Also, the grooved dielectric layer can also be produced by the photopolymerizable resin technique pioneered by Minnesota Mining and Manufacturing in the manufacture of video discs. The resin in liquid form is poured onto a mold containing the grooves. The substrate coated with the reflective surface is placed face down on the liquid. Ultraviolet light is passed through the mold which must be at least translucent such that the ultraviolet light polymerizes the resin to form the desired dielectric coating. The liquid resin may also contain a chemical curing agent. The thickness of the transparent layer 31 may range from between one half to twenty microns, with a preferred thickness being between one and two microns for recording of one micron holes. Thickness is measured with respect to the upper surface 33 of the transparent coating, which forms a reference elevation. For best results the thickness of the transparent coating and the focal spot of the laser beam must be such that focused laser light from the read beam is not spread over more than one groove. The thickness of the dielectric layer should be the equivalent of an integral number of half wavelengths at the characteristic wavelength of the read/write laser so that the reflectivity of the recording layer as seen through the dielectric layer is reduced a minimal amount. That is, maximum reflectivity is preferred.

With respect to the characteristic wavelength of a laser to be used for reading the encoded data, grooves are formed in the transparent layer having groove depths of approximately one eighth and approximately one quarter wavelength in air of the characteristic readback wavelength, relative to the reference elevation 33. By "approximately" is meant to within 10% to 15% of the specified wavelength, and preferably to within 5%. One quarter wavelength deep grooves 35, 37 and 39 may be seen, as well as the long one eighth wavelength deep groove 41 which resembles a plateau.

Preferably, the transparent coating material is initially fluid, but curable to a tough, solid surface either by heat, chemicals or radiation, or a combination of these. The grooves 35, 37, 39, 41 are formed in the material before it is cured. The grooves may be molded, in the same way that video discs are made. The internal lengthwise and lateral wall-to-wall width dimension of each groove is approximately one-third to one micron and typically 0.3 to 0.8 microns with a minimum land width separating adjacent grooves of approximately one micron. The material for the transparent coating 31 should be selected so that the index of refraction is sufficiently high that the reference grooves 35, 37, 39 yield minimum specular reflection of less than 50% of that achieved at reference area 33. Clear polymethyl methacrylate or polyvinyl chloride could perform this function.

Figure 3:
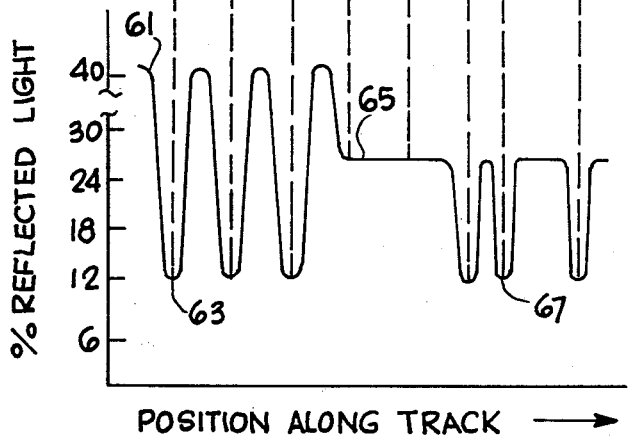
FIG. 3 is a magnified top plan view of seven adjacent data paths.

With reference to FIG. 3 a top view of six of the data tracks 19, illustrated in FIG. 1, are shown. In particular, track 1 of FIG. 3 corresponds to the track illustrated in the sectional view of FIG. 2. In FIG. 3, the first three marks 45, 47, 49 correspond to the quarter wavelength grooves 35, 37 and 39 in FIG. 2. These grooves produce interference effects with a single wavelength laser which are easily detectable in a photodetector such as a push-pull photodiode of the type described in U.S. Pat. No. 4,209,804.

The solid line 51 represents a long groove corresponding to plateau 41 in FIG. 2. This groove has a depth of approximately one eighth wavelength compared to the surface on either side of the groove. The groove will cause some scattering of light therefrom. The oval marks 55, 57 and 59 correspond to holes 25, 27 and 29 in FIG. 2. All of the marks 45, 47, 49, 55, 57 and 59 are on the same circular track. As the disc rotates, a reading beam may scan these marks as the marks pass directly below the beam. The depth of focus of the beam, as well as the lateral positioning of the beam, is controlled by servo mechanisms. The beam focus is maintained on the reflective layer 23 in FIG. 2, while lateral adjustment of the beam is maintained by servo marks. It does not make any difference whether the quarter wavelength grooves or the one eighth wavelength grooves are used as track or data path markers, i.e., servo tracks, although the eighth wavelength would generally be used for this purpose. The prerecorded grooves can be used for track identifiers and microprogram information. For example, in FIG. 3 the marks 45, 47 and 49 may be used to indicate a sector address. The oval marks 55, 57 and 59 indicate user data formed by pits or holes in reflective layer 23. Other tracks have similar servo indicators, as well as other address and user data.

Figure 4:
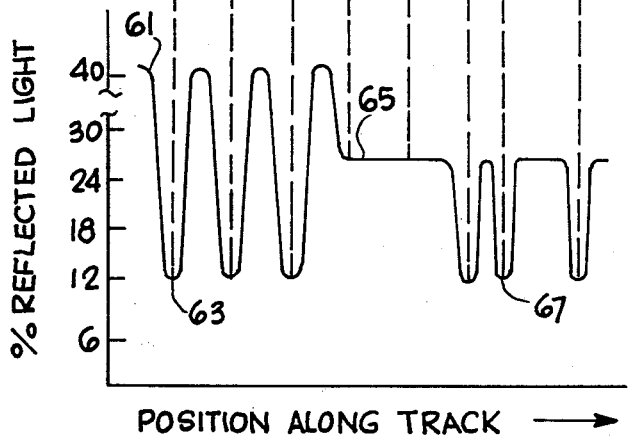
FIG. 4 is a plot of reflected light amplitude versus track distance for the data path of FIG. 2 when a reading laser is used to illuminate the surface.

With reference to FIG. 4, the amplitude of reflected light as a function of track position may be seen. The plot of FIG. 4 corresponds to one example of the grooves and pits of the upper track in FIG. 3. The reference elevation 33 of FIG. 2, without any grooves or pits, yields the highest reflectance 61, approximately 42% of the incident light. The quarter wavelength grooves 35, 37, 39 cause light interference relative to light reflected from immediately surrounding areas such that a reflectance level 63 of approximately 12% results. The one-eighth wavelength groove 41, indicated by line 51 in FIG. 2, produces reflected light at a third level 65, approximately 26% of the emitted light. Lastly, the holes 25, 27 and 29 produce a similar reflectance level 67, approximately 10%. In general the reflectance from the one-quarter wavelength grooved areas would be less than 20% and the reflectance from the one-eighth wavelength grooved areas would be less than 40% and preferably less than 30%.

The preferred reflective material, known by the trademark Drexon, is made in the following manner. The surface of a fine grained silver-halide emulsion is exposed briefly to a low-to-moderate level of actinic radiation. This exposed silver halide is then developed to an optical density typically 0.05 to 2.0, as measured with red light of a photographic densitometer. This gelatin layer containing filamentary silver particles exhibits an optical density of typically 0.05 to 0.8 for a 3 micron emulsion and 0.1 to 1.5 for a 6 micron emulsion. After this initial processing step, the emulsion is gray in appearance, but a large amount of the silver halide in the emulsion remains unaltered. A very thin stratum of unexposed silver halide at the surface of this partially developed emulsion layer is then chemically fogged to form a very dense layer of silver precipitating nuclei at that surface. The fogged medium is finally subjected to a negative silver diffusion transfer step wherein the silver halide in the emulsion is solvated to form soluble silver complexes. These silver complexes are precipitated on the silver precipitating nuclei to form reflective layer 23 comprising non-filamentary silver particles which aggregate with the filamentary silver. The degree of reflectivity of the surface may be adjusted over a range of values depending upon the ratios of the two types of silver. This same mechanism also causes some of the silver ion complex to precipitate on the filamentary silver in the absorptive underlayer 22, increasing the optical density to red light of this already developed underlayer typically by about a factor of two increase in light absorption.

The final result of these exposure and development sequences is a laser recording medium having a reflectivity of at least 15% and typically 45% which is comprised of a very thin layer 23 of reflective but non-electrically conducting reduced non-filamentary silver and a smaller amount of filamentary silver, under which lies an optional absorptive layer 22 consisting primarily of filamentary silver in a gelatin matrix. This absorptive underlayer would have an optical density to red light of between 0.2 and 3.0. The original silver-halide emulsion photosensitive medium which eventually results in the above described reflective laser recording medium is usually coated on a glass substrate which is retained as substrate 21 in FIG. 2. This substrate and its coatings may have a central hole 13 in FIG. 1 cut therein so that the entire disk assembly can be rotated by a spinner mechanism. The reflective surface has a reflectivity to green light of 44% for a typical sample, prior to coating with the transparent dielectric coating 31.

One advantage of the present invention is in the manufacturing process. There is no need for vacuum deposition of a metallic reflective coating after the creation of the dielectric encoded layer. Once the reflective surface is produced it is coated with an optically transparent dielectric material containing grooves which are molded or pressed into portions of the material for encoding prerecorded information. Another advantage is that the clear dielectric coating also protects the reflective layer from scratches, fingerprints and some types of undesirable atmospheric conditions.

It will be realized that the present invention may be used for read-only applications, in which case the media is data storage media. In this instance low reflectivity spots or holes or pits may be created by replication techniques, such as photolithography or stamping. The terms "low reflectivity spots" and "holes" and "pits" are used interchangeably herein. The invention may also be used for read and write applications, in which case the media is laser recording media. In this instance the holes or pits may be created by lasers, as well as other methods.

I claim:

1. Optical data storage and laser recording media for readback by a laser beam having a characteristic wavelength comprising,
    a major reflective surface layer disposed on a substrate, said reflective surface layer adapted for optical data storage and recording by pit formation from a laser, and
    an optically clear dielectric coating covering said reflective surface layer, the coating having grooves defining parallel data paths, at least some of said grooves in the coating of a depth approximately equal to one or three times one quarter of a characteristic readback beam wavelength, the index of refraction of said coating being higher than that of air and the reflectance from a surface area containing said grooves being less than 20% at the characteristic wavelength.

2. Optical data storage and laser recording media for readback by a laser beam having a characteristic wavelength comprising,
    a major reflective surface layer disposed on a substrate, said reflective surface layer adapted for optical data storage and recording by pit formation from a laser, and
    an optically clear dielectric coating covering said reflective surface layer, the coating having grooves defining parallel data paths, at least some of said grooves in the coating of a depth approximately equal to one or three times one eighth of a characteristic readback beam wavelength, the index of refraction of said coating being higher than that of air and the reflectance from a surface area containing said grooves being less than 40% at the characteristic wavelength.

3. The recording media of claim 1 wherein said grooves define a first set of recorded data and said media have other grooves in the coating of a depth approximately equal to one or three times one eighth of said characteristic wavelength, defining a second set of data.

4. The recording media of claim 2 wherein said grooves define a first set of recorded data and said media have other grooves in the coating of a depth approximately one or three times one quarter of said characteristic wavelength, defining a second set of data.

5. The recording media of claims 1 or 2 having pits in said reflective surface layer encoding data.

6. The recording media of claim 3 or 4 wherein a third set of data encoded therein comprises pits in said reflective surface layer.

7. The recording media of claim 3 or 4 wherein said first set of data comprises a plurality of individual grooves in said dielectric coating having a radial dimension less than one micron.

8. The recording media of claim 3 or 4 wherein said second set of data comprises an elongated groove in said dielectric coating directly overlying pits in said major reflective surface layer.

9. A method of making optical data storage or laser recording media for use with a readback light beam having a characteristic wavelength comprising,
    disposing a reflective laser recording material on a substrate to form a major surface layer for pit formation therein,
    coating the major surface layer of said laser recording material with an optically transparent dielectric material, the maximum thickness of said material being such as to prevent a focussed read beam from passing through more than one groove at any one time,
    prerecording information on said transparent dielectric material by creating grooves in portions of said dielectric material, said grooves having depths effective for encoding of said information by interference and scattering of the readback light beam, leading to partial reflection of the beam from said grooves compared to the reflection of the major surface layer underlying said dielectric material.

10. The method of claim 9 further defined by creating grooves in said dielectric material at depths of approximately one or three times one quarter of the characteristic wavelength of the readback light beam.

11. The method of claim 9 further defined by creating grooves in said dielectric material at depths of approximately one or three times one eighth of the characteristic wavelength of the readback light beam.

12. The method of claim 9 further defined by forming data path markers in said coating, said data path markers comprising grooves created in said dielectric material at a depth of approximately one or three times one eighth of the characteristic wavelength of the readback light beam.

13. The method of claim 12 further defined by forming header information in proximity to said data path markers, said header information comprising grooves created in said dielectric material at a depth of approximately one or three times one quarter of the characteristic wavelength of the readback light beam.

14. The method of claim 12 further defined by forming user data bits in proximity to said data path markers by directing laser light onto said major surface layer for pit formation.

15. The method of claim 9 further defined by forming data path markers in said coating, said data path markers comprising grooves created in said dielectric material at a depth of approximately one or three times one eighth of the characteristic wavelength of the readback light beam.

16. The method of claim 15 further defined by forming header information in proximity to said data path markers, said header information comprising multiple grooves created in said dielectric material at a depth of approximately one or three times one quarter of the characteristic wavelength of the readback light beam.

17. The method of claim 15 further defined by forming user data bits in proximity to said data path markers by directing laser light onto said major surface layer for pit formation.

* * * * *